May 13, 1952 — J. A. HOWARD — 2,596,482

TOOL-HOLDING INDEXING TURRET

Filed April 21, 1950 — 3 Sheets-Sheet 1

Inventor
JOSEPH A. HOWARD
By C. G. Stratton
Attorney

May 13, 1952 J. A. HOWARD 2,596,482
TOOL-HOLDING INDEXING TURRET
Filed April 21, 1950 3 Sheets-Sheet 2
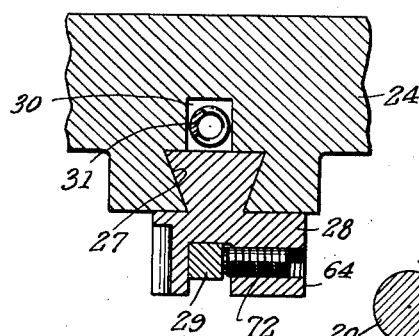
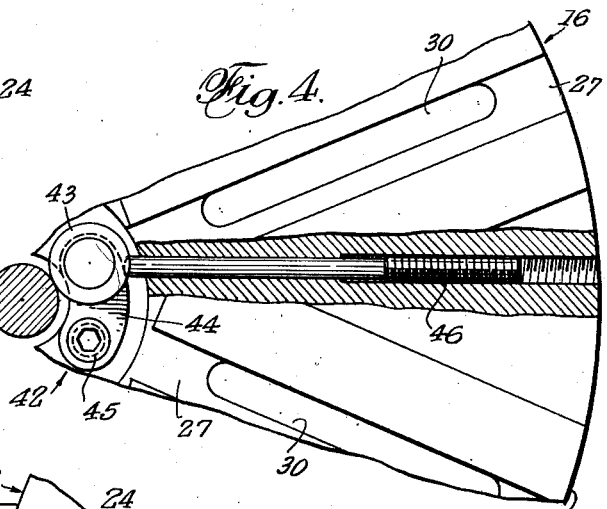
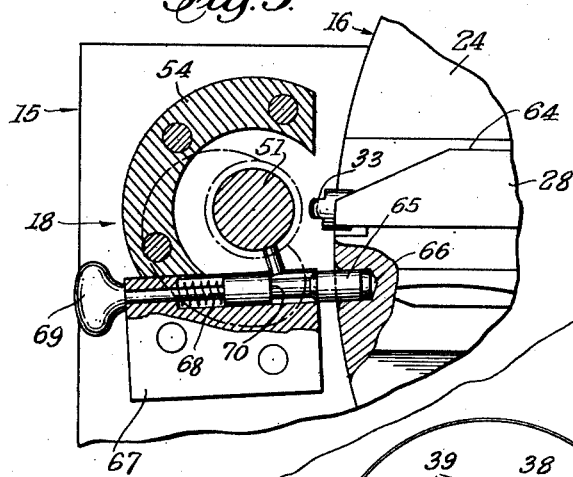
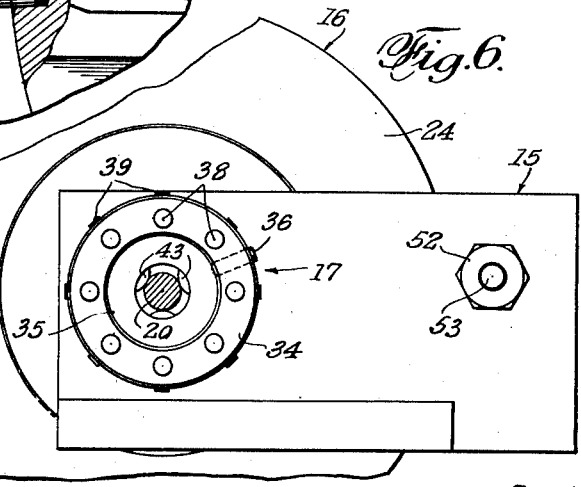
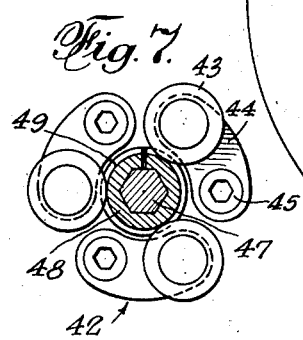
Inventor
JOSEPH A. HOWARD
By C. G. Stratton
Attorney

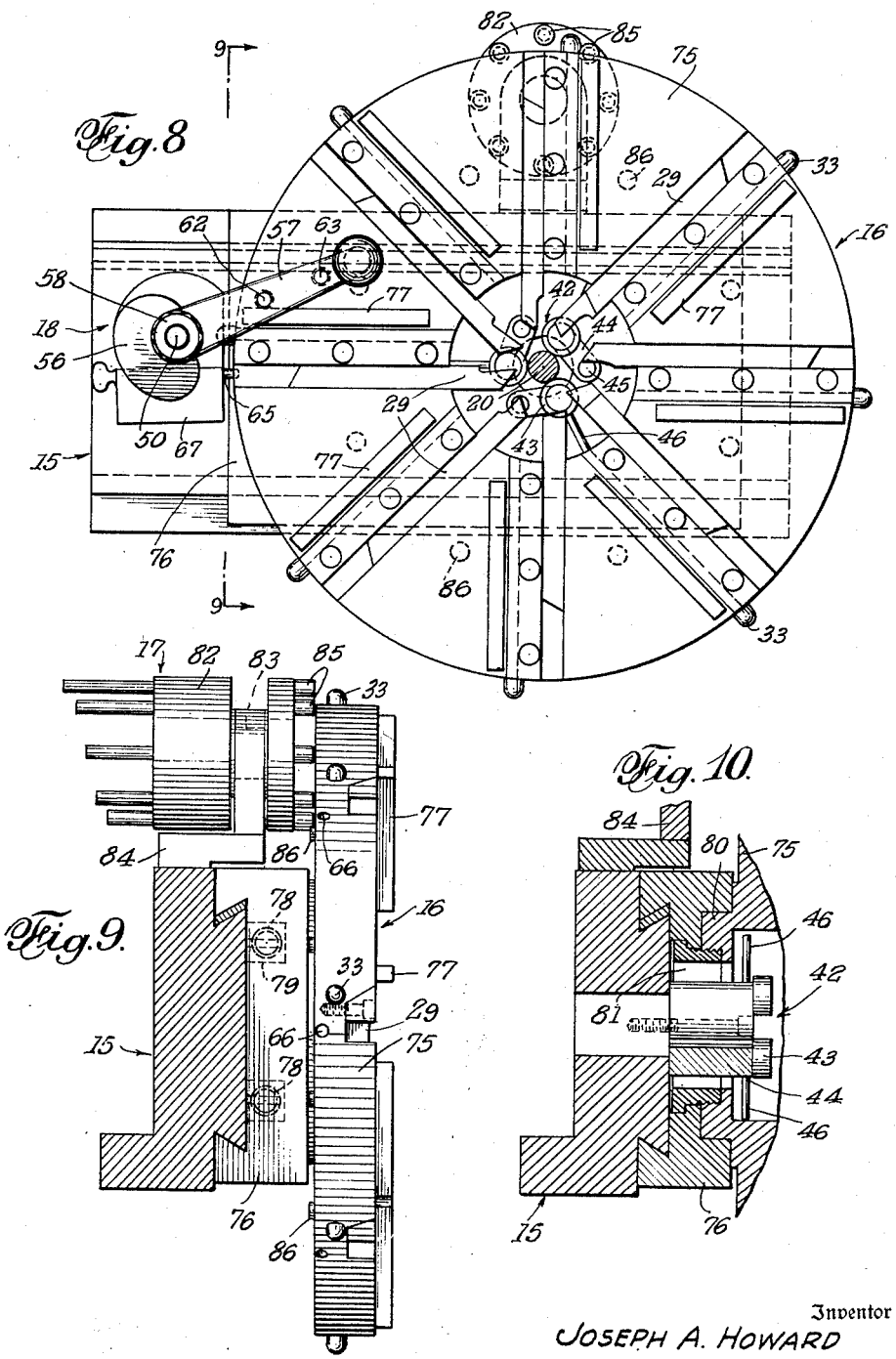

Patented May 13, 1952

2,596,482

UNITED STATES PATENT OFFICE 2,596,482

TOOL-HOLDING INDEXING TURRET

Joseph A. Howard, Sun Valley, Calif.

Application April 21, 1950, Serial No. 157,255

9 Claims. (Cl. 29—41)

This invention relates to an indexing turret for holding a plurality of tools and, while the same may be employed as an attachment for other machines, is particularly adapted to be mounted on the carriage of a lathe.

Tool holders of the turret type are well known. Conventionally, such prior devices index on a vertical axis to place the tools, selectively, in operative position and are fed toward the work by movement of the cross-slide of the lathe carriage. Longitudinal feed of the operating tool is usually limited by outside stops that must be provided independent of the turret and usually are carried by the lathe bed and engage the carriage. Independent set-up, therefore, of the turret and movement-limiting stops, is required.

It is an object of the present invention to provide a tool-holding indexing turret which embodies both a plurality of tools and stop means for limiting the longitudinal feed of the tools.

Another object of the invention is to provide a tool holder adapted to be mounted on a carriage that constitutes a complete unitary device embodying a set of successively operable tools and stop means associated with said tools whereby, by simple rotation of a crank handle, the tools are sequentially brought to the work, and, by control of the carriage, the tool that is operating is moved along the work, as desired.

Another object of the invention is to provide a tool holder having an indexing tool-holding turret that embodies novel crank-controlled means for effecting alternate tool feed and indexing movement of the turret for each full revolution of the crank.

A further object of the invention is to provide in a tool-holding turret, novel work or stock support means that support the stock immediately adjacent to the point of application of the various tools carried by the turret.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes embodiments of the present invention, which are given by way of illustration or example only.

In the drawings, like reference characters designate similar parts in the several views.

Fig. 3 is an enlarged cross-sectional view as taken on line 3—3 of Fig. 2.

Fig. 4 is a fragmentary view, partly in section, of means for locking the stock support means.

Fig. 5 is a vertical sectional view as taken on line 5—5 of Fig. 1.

Fig. 6 is a face view as seen from the opposite side of Fig. 2.

Fig. 7 is a face view of a modified form of stock support means.

Fig. 8 is a face view of a modified form of indexing turret.

Fig. 9 is a cross-sectional view as taken on line 9—9 of Fig. 8.

Fig. 10 is a fragmentary cross-sectional view as taken through the center of the turret shown in Figs. 8 and 9.

Figure 1:
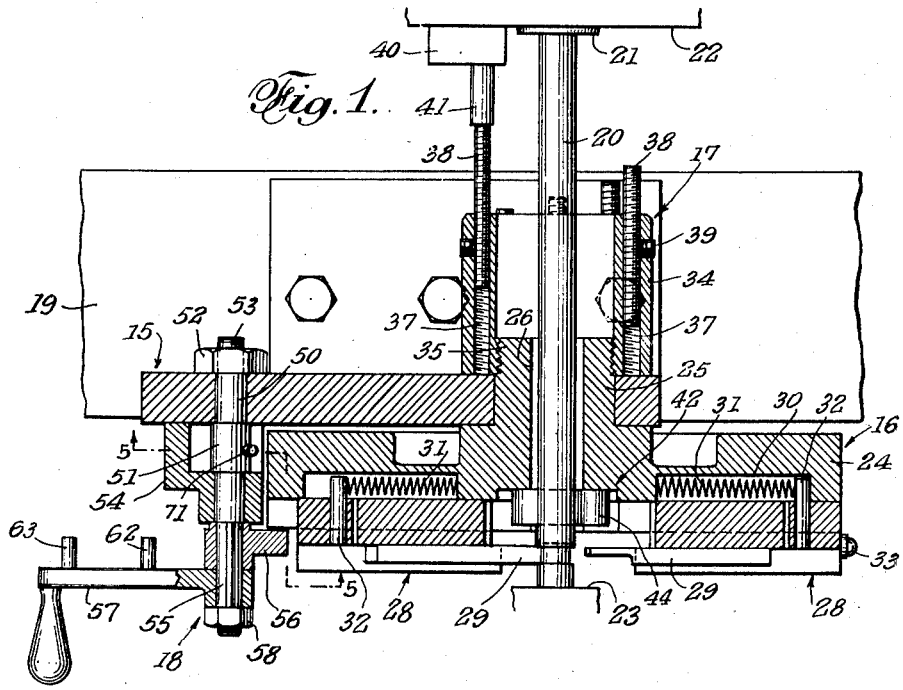
Fig. 1 is a plan sectional view of a preferred form of tool-holding indexing turret and embodying features of the present invention.

The present tool-holding indexing turret comprises, generally, a mounting bracket 15, a tool-holding turret 16 on said bracket, stop means 17 connected to the turret 16, and operating means 18 to index the turret and simultaneously shift the stop means.

According to the invention, the present device is mounted on the carriage 19 of a lathe or like machine tool, the same being movable in the usual manner longitudinally along the bed of such a tool. While such a carriage is provided with a cross-slide and, in practice, the present device is affixed to the same, said cross-slide has no operative movement relative to the carriage, merely comprising a convenient place for affixing bracket 15 to said carriage. While not shown, carriage 19 has conventional mechanism, controlled by a hand wheel, for effecting longitudinal movement thereof.

The work or stock 20 to be operated on by the present device, extends centrally through the turret 16 and is held by the usual chuck means 21 of a head stock 22. A tail stock 23, comprising a stock feed limiting abutment, is also provided in the usual manner.

Figure 2:
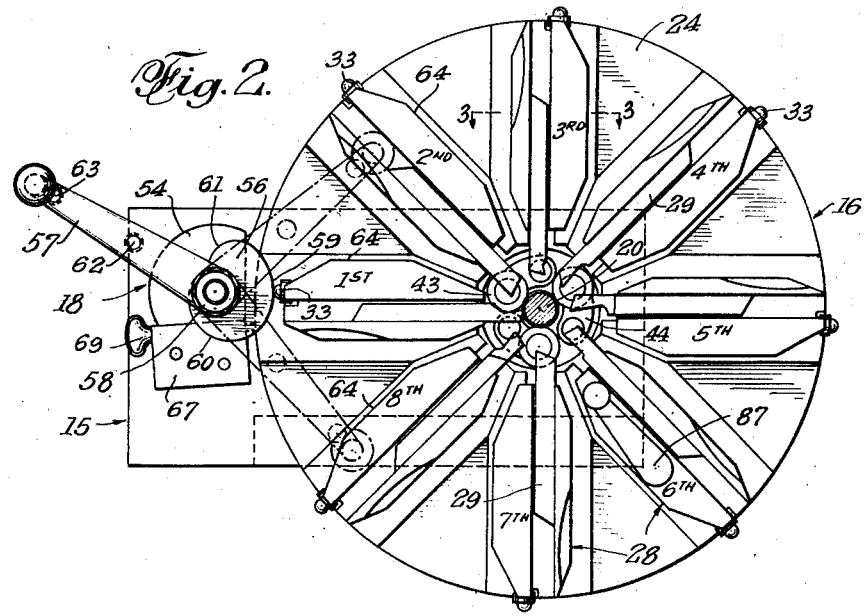
Fig. 2 is a face view thereof.

With more particular reference to the form of the invention shown in Figs. 1 through 6, the turret 16 comprises a plate 24 provided with a central boss 25 that extends through and has rotational bearing in bracket 15. An axial passage 26 in said plate and boss freely passes stock 22. Thus, plate 24 is disposed in a vertical plane and is mounted for rotation on the horizontal axis of disposition of said stock 20.

The face of plate 24 on the tail stock side of the device is provided with a plurality of radial slideways 27 that are uniformly spaced. In this case, eight such slideways are shown. In each slideway there is mounted a tool slide 28 and each slide mounts a tool 29. The operative ends of said tools are directed toward the stock 20. Recesses 30 are formed in plate 24 for compression springs 31 which, at one end, are abutted against the inner ends of recesses 30 and, at the other end, outwardly press against pins 32 of the slides 28 to outwardly project said slides to retract the tools 29 away from stock 20. The outer ends of recesses 30 limit such retraction. The outer end of each tool slide 28 is provided with an adjustable stud 33, the same extending radially for operative engagement with the operating means 18.

The stop means 17 comprises a collar 34 that serves as a nut to engage the threaded end 35 of boss 25 to rotationally lock the turret plate 24 on bracket 15. One or more set screws 36 are employed to lock the assembly for the mentioned free rotation. Collar 34 is provided with a set of uniformly spaced threaded taps 37, equal in number to the tool slides 28, and extending through the wall of the collar parallel to the axis thereof. Each tap 37 is fitted with a stop screw 38 and the same are held in adjusted position by set screws 39. It will be understood that stop screws 38 are adjusted endwise to protrude varying distances beyond the end of collar 34 according to where, along stock 20, the different tools 29 are to operatively engage said stock. The head stock 22 mounts a block 40 on which is provided an abutment projection 41 that has sequential engagement with stop screws 38 as will be later more fully described. The degree of projection of abutment 41 is such that, when the stop screw 38 having least projection beyond the collar, is engaged with the abutment, the stop screw having most projection will be clear of the head stock.

It will be noted that there is considerable overhang of the stock beyond chuck means 21. In order to hold the same steady at a point immediately adjacent to tools 29, the turret 16 is provided with means 42 for supporting the stock in a manner to allow free rotation thereof while being operated on by said tools. Said means 42 is shown as comprising three rollers 43 carried on the ends of three arms 44 and uniformly arranged around the axis of the stock 20. Arms 44 are mounted on pivots 45 around which they are adjustable. Said pivots comprise cap screws which, when loosened, allow the rollers 43 to be brought against the stock by means of radially disposed pressure screws 46 accessible for adjustment from the peripheral face of plate 24. After such adjustment is made, pivot screws 45 are tightened to lock the arms 44 and effect the mentioned roller support of the stock.

In instances where the stock 20 has an other than round cross-section as shown by the polygonal cross-section 47 of Fig. 7, a split and flanged collar 48 may be strung on the stock so that the rollers 43 engage the outer cylindrical face 49 of said collar and the flanges engage the opposite ends of rollers 43. As the stock revolves to revolve said collar, the former is held steady by rollers 43. The split in the collar is helically formed so that said rollers will smoothly ride thereover. The collar is made to snugly yet resiliently fit the stock to minimize play and yet allow the stock to move endwise therethrough.

The operating means 18 comprises a stud 50 having rotational bearing in bracket 15 and held against endwise movement by an enlarged portion 51 of the stud and a nut 52 on a threaded and reduced end 53 of said stud. A bracket 54, affixed to bracket 15, has steadying bearing engagement with the stud beyond portion 51. An extension shank 55 of the stud has a cam 56 and an operating handle 57 affixed thereto as by a key, and a nut 58 on the stud locks the assembly.

Cam 56 is of the plate type and is formed to have a single lobe that has an intermediate high dwell portion 59 with a slow rise portion 60 on one side and a somewhat more rapid drop portion 61 on the opposite side. Said cam 56 is aligned with and has sequential operative engagement with studs 33 to effect sequential movement of slides 28 and the tools 29 thereof in a direction toward stock 20, upon rotation of handle 57 on the axis of stud 50.

Handle 57 is provided with means, shown as two spaced pins 62 and 63, that project to engage side faces 64 of slides 28 to thereby rotate the turret on its axis. The outermost pin 63 is so positioned that it will clear one slide, engage the adjacent slide (the one that is aligned between the axes of the turret and the operating means stud 50) and index the turret by moving the latter slide through an increment of rotation of the turret equal to the angle between slides. Thus, for an eight-slided turret, such indexing movement is 45°.

The operating means includes a bolt 65 that has locking engagement with the turret plate 24 by entering seats 66 provided in the peripheral face of said plate. Said bolt is slidably mounted in a block 67 carried by bracket 15 and is urged in a direction toward said seats by a spring 68. A knob 69 for manual retraction of said bolt may be provided. An intermediate part of the bolt is reduced to provide a shoulder 70 that is engaged by a pin 71 radially projecting from stud portion 51 to effect momentary retraction of the bolt for each revolution of handle 57.

When the device is set up for a particular job, the tools 29 are locked in the slides 28 as by set screws 72. Their positions may be approximate since studs 33 can be adjusted to bring the operating end of each tool 29, when a slide is projected by cam 56, to cut into stock 20 to the depth desired. The protrusion of stop pins 38 is then adjusted with that pin which is associated with the first slide to be projected longest, and the other pins shorter commensurate with the spacing along the stock that the tools are to cut. Thus, after the first tool has made its cut and the next tool is to make a cut one-quarter inch away, the next stop pin will be one-quarter inch shorter than the stop pin for the first tool. The other stop pins are set accordingly.

For a clearer understanding of the operation, the slides 28 have been indicated 1st to 8th, successively. With handle 57 in a depending position so that cam rise 60 is just clear of stud 33 of the 1st slide, all of the slides are held retracted by their springs 31. The stock 20 is fed through and is stopped by tail stock 23. The carriage 19 is then adjusted to engage the stop pin 38 that is associated with the 1st slide, with projection 41. Handle 57 is rotated through one revolution. During the first part of the revolution, the cam portion 60 will engage stud 33 and project the 1st slide toward the stock which is being rotated by chuck means 21. The tool 29 of said slide will, therefore, cut into the stock and make a cut according to the contour of said tool and to the adjusted depth. As the high part 59 of the cam moves past stud 33 from the full line position to the upper dot-dash line position of Fig. 2, the drop 61 of the cam allows spring 31 to retract the slide. At this time pin 63 clears the 2nd slide as the handle moves toward the 1st slide. Now the cam is clear of stud 33 and said first slide is fully retracted. Before pin 62 achieves engagement with the side face 64 of the 1st slide, pin 71 effects retraction of bolt 65 and the turret is unlocked. Continued operation of the handle will cause first pin 62 and then pin 63 to engage the 1st slide to displace the same to the position of the 8th slide. During this latter movement, bolt 65 is released and rides the peripheral face of the turret plate. Consequently, when seat 66 associated with the 2nd slide finds said bolt, the latter will be projected by its spring 68 to again lock the turret. Now, the 2nd slide is in the position originally occupied by the 1st slide.

During the above-described indexing movement of the turret, the stop pin 38 associated with the 1st slide moves away from projection 41 and the stop pin associated with the 2nd slide moves into alignment with said projection. Now, the carriage 19 is moved to abut the latter stop pin and said projection to move the device along the stock. A second revolution of the handle will repeat the above cycle of operation in which the tool of the 2nd slide performs its operation. Thus, the eight tools, successively, are brought into operation on the stock by alternately operating handle 57 and feeding carriage 19.

The overall cycle of operation is completed when the tool of the 8th slide performs a cut-off operation to finish the work-piece. By again feeding the stock against tail stock 23 and returning the carriage to its initial position, a similar piece is made in the above-described manner.

It will be understood that a piece of work may be completed with one, two or four tools and, therefore, one revolution of the turret may produce eight, four or two pieces of work, accordingly. Also, by holding the handle 57 so that the dwell 59 of the cam projects a tool, and by suitable arrangement of the stop pins, a relatively long portion of stock 20 may be machined simply by feeding carriage 19. Thus, the device may be rigged to produce articles such as headed pins, etc.

In the form of the invention shown in Figs. 8 through 10, instead of the tools being carried by individual slides, the same are carried on an indexing turret 75 that is bodily shifted by operating means 18.

In this form, bracket 15 mounts a slide 76 on which turret 75 is revolubly mounted. Indexing of said turret is effected by a handle 57, as before, that, successively, engages fixed cleats 77 that serve as counterparts for the side faces 64 of slides 28. Springs 78, housed in recesses 79 in slide 76, retract the turret in the same manner that springs 31 retract slides 28. Since turret 75 moves laterally, in this case, the stock support means 42 is mounted on bracket 45, as best seen in Fig. 10, the hub or boss 80 of the turret being provided with a sufficiently large central passage 81 to permit the turret to shift.

Because of the present arrangement, stop pins 38 are carried on a member 82 that is rotatably mounted at 83 on a bracket 84 affixed to bracket 15, the same, therefore, being eccentric with respect to the axis of turret 75. A set of indexing pins 85 is carried by member 82, the same being successively engaged by pins 86 on the side face of the turret. Thus, as the turret is indexed, the pins 38 are similarly indexed in a geared manner but one that is comparable in function to that previously described.

In other respects, the two forms here disclosed are similar and function to produce a piece of work as described hereabove.

In either of the forms shown, instead of a tool or in connection therewith, a retractible stop 87 may be provided. The same may be provided to obviate the need of the stop provided by tail stock 23 and the latter may be dispensed with, if desired.

While the invention that has been illustrated and described is now regarded as the preferred embodiments, the constructions are, of course, subject to modifications without departing from the spirit and scope of the invention. It is, therefore, not desired to restrict the invention to the particular forms of construction illustrated and described, but to cover all modifications that may fall within the scope of the appended claims.

Having thus described the invention, what is claimed and desired to be secured by Letters Patent is:

1. The combination with the carriage of a lathe or like machine, of a vertically disposed turret having its axis of rotation coincident with the axis of stock rotated by said machine, a support bracket rotationally mounting said turret and affixed to the carriage, a plurality of radially arranged tools for working on said stock and uniformly arranged on the turret, means normally retracting the tools from the stock and handle-operated means carried by the bracket, said latter means comprising a portion to move one of said tools transverse to said axis to operate on the stock and to release said tool for retraction to normal position, and a portion to index the turret to displace said tool with another of said plurality of tools after the mentioned release of the tool that was moved.

2. The combination with the carriage of a lathe or like machine, of a vertically disposed turret having its axis of rotation coincident with the axis of stock rotated by said machine, a support bracket rotationally mounting said turret and affixed to the carriage, a plurality of radially arranged tools for working on said stock and uniformly arranged on the turret, indexible stop means operatively connected to the turret and movable during the indexing movement of the latter for engaging a portion of said machine to locate the said tools at different points along the axis of the stock, means normally retracting the tools from the stock and handle-operated means carried by the bracket, said latter means comprising a portion to move one of said tools transverse to said axis to operate on the stock and to release said tool for retraction to normal position, and a portion to index the turret to displace said tool with another of said plurality of tools and simultaneously index the stop means after the mentioned release of the tool that was moved.

3. The combination according to claim 2 in which the stop means comprises a set of individually adjustable stop members and in which each tool is operatively associated with one of said stop members, whereby each stop member locates its respective tool at a desired point along the stock.

4. In a device of the character described, a support bracket movable longitudinally relative to a length of stock, a turret mounting a plurality of tools and revolubly carried by the bracket, said turret having a central passage through which said stock extends, stop means also carried by the bracket to locate the latter and the tools on the turret longitudinally relative to said stock, a single revolution operating handle carried by the bracket beyond the periphery of the turret, a cam controlled by said handle to move one of said tools into position to operate on the stock, and means operatively interengaging said handle and turret to index the latter and the stop means, simultaneously.

5. In a device of the character described, a support bracket movable longitudinally relative to a length of stock, a turret mounting a plurality of tools and revolubly carried by the bracket, said turret having a central passage through which said stock extends, stop means also carried by the bracket to locate the latter and the tools on the turret longitudinally relative to said stock, stock-steadying means mounted on the axis of the turret and movable with the bracket, said stock-steadying means being adjacent to that portion of the stock being operated on by each successive tool, a single revolution operating handle carried by the bracket beyond the periphery of the turret, a cam controlled by said handle to move one of said tools into position to operate on the stock, and means operatively interengaging said handle and turret to index the latter and the stop means, simultaneously.

6. In a device of the character described, a support bracket movable longitudinally relative to a length of stock, a turret mounting a plurality of tools and revolubly carried by the bracket, said turret comprising a plate having radial slideways and having a slide in each slideway, said tools being affixed to said slides, said turret having a central passage through which said stock extends, stop means also carried by the bracket to locate the latter and the tools on the turret longitudinally relative to said stock, a single revolution operating handle carried by the bracket beyond the periphery of the turret, a cam controlled by said handle to move one of said tools into position to operate on the stock, and means operatively interengaging said handle and turret to index the latter and the stop means, simultaneously.

7. In a device of the character described, a support bracket movable longitudinally relative to a length of stock, a turret mounting a plurality of tools and revolubly carried by the bracket, said turret comprising a plate on which said tools are fixedly and radially arranged, a slide engaged with the bracket and rotationally carrying said plate, said turret having a central passage through which said stock extends, stop means also carried by the bracket to locate the latter and the tools on the turret longitudinally relative to said stock, a single revolution operating handle carried by the bracket beyond the periphery of the turret, a cam controlled by said handle to move one of said tools into position to operate on the stock, and means operatively interengaging said handle and turret to index the latter and the stop means, simultaneously.

8. In a device of the character described, an indexing turret mounting a set of radially disposed tools directed to operate on a length of stock extending through the center of rotation of the turret, a cam mounted eccentrically of the turret and engageable with the same to shift the tools transversely toward the stock, said turret having an abutment portion associated with each tool, a handle for revolving the cam, and projecting means on the handle for engaging said abutment portions to index the turret, said latter means and the cam being so phased that the cam first shifts the tools and said projecting means then indexes the turret.

9. In a device of the character described, a support bracket movable longitudinally relative to a length of stock, a turret mounting a plurality of tools and revolubly carried by the bracket, said turret having a central passage through which said stock extends, stop means also carried by the bracket to locate the latter and the tools on the turret longitudinally relative to said stock, a single revolution operating handle carried by the bracket beyond the periphery of the turret, a member controlled by said handle to move one of said tools into position to operate on the stock, and means operatively interengaging said handle and turret to index the latter and the stop means, simultaneously.

JOSEPH A. HOWARD.

REFERENCES CITED

The following references are of record in the file of this patent:

UNITED STATES PATENTS

| Number | Name | Date |
|---|---|---|
| 674,177 | Von Pittler | May 14, 1901 |
| 1,097,914 | Catucci | May 26, 1914 |

FOREIGN PATENTS

| Number | Country | Date |
|---|---|---|
| 7,267 | Great Britain | July 1, 1899 |